United States Patent Office 3,300,384
Patented Jan. 24, 1967

3,300,384
PROCESS FOR THE PRODUCTION OF PURE PREPARATIONS OF THE KALLIKREIN INACTIVATOR
Fritz Schultz, Wuppertal-Sonnborn, Germany, assignor to Farbenfabriken Bayer Aktiengesellschaft, Leverkusen, Germany, a corporation of Germany
No Drawing. Filed Apr. 2, 1964, Ser. No. 356,954
Claims priority, application Germany, Apr. 11, 1963,
F 39,464
2 Claims. (Cl. 167—74)

The present invention relates, in general, to a new and improved process for the production of pure preparations of the inactivator for the circulatory hormone kallikrein. More particularly, the invention provides for the production of pure preparations of the kallikrein inactivator from its solutions by precipitation of the same with polyphosphoric acids or their water-soluble salts followed by suitable treatment of the precipitate for the recovery of the desired pure inactivator.

In German application F 37,584 there is described and claimed a unique process for the production of pure preparations of the kallikrein inactivator whereby the same is precipitated from its solutions with metaphosphoric acid, the precipitate is separated, decomposed by dissolution within caustic alkali or salt solutions, and the solution freed from the salts according to known techniques.

The present invention is based, at least in part, on our discovery that pure preparations of the kallikrein inactivator can be produced and recovered in high yields by precipitation of the same from its solutions through use of polyphosphoric acids or their water-soluble salts, separating the resulting precipitate, decomposing it by dissolving in salts or salt solutions, and freeing the solution from the salts via known techniques. In accordance with the process of the present invention, it is found that suitable salts of polyphosphoric acids include primarily the alkali metal and ammonium salts.

Pursuant to the practice of the process of our invention, decomposition of the hardly-soluble precipitate can be effected by dissolving the same in caustic soda or in salt solutions as, for example, aqueous solutions of NaCl or $NH_4Cl$ in concentrations of more than one (1) percent. Removal of the polyphosphoric acids or their salts is accomplished by the application of known techniques, e.g., by treating the solutions with exchangers or by dialysis, and the like.

The process of the invention is applicable for use in conjunction with solutions containing the kallikrein inactivator which are obtained from animal organs containing the same, such as the parotid gland, lungs, liver, pancreas, spleen, lymph glands, etc.

The process results in the production of almost pure solutions of the kallikrein inactivator in yields of approximately eighty (80) percent. If the resulting solutions are lyophilized, a readily water-soluble substance is obtained of which 0.16–0.19$\gamma$ have the biological activity of one kallikrein inactivator unit.

As is now readily established, the preparations purified by the process of the invention find direct utility in the treatment of pancreatic disturbances including, for example, those of a pre-operative, control or preventative, and post-operative nature.

It is believed that the foregoing principles and procedures of the invention may be best understood by reference to the following specific examples illustrating the application of the same to the recovery of a pure solution of the kallikrein inactivator from a relatively impure solution thereof via the process of the invention:

Example I

Kallikrein inactivator, in amount of 1.080 grams of purity 0.54$\gamma$/KIU, was dissolved in 40 cubic centimeters of redistilled water and precipitated with 5 cubic centimeters of a freshly prepared 10 percent polyphosphoric acid. After one-half hour the precipitate was centrifuged, washed with 10 cubic centimeters of distilled water and again centrifuged. The residue was suspended in 100 cubic centimeters of redistilled water. It was then redissolved, while stirring, with 5 cubic centimeters of N/10 caustic soda. This solution was then caused to flow through an exchanger column which had been charged with 15 cubic centimeters of a cation exchange resin (Levatit S 100 or Amberlite IR/20) and 45 cubic centimeters of an anion exchanger (Amberlite IRA 410).

The solution flowing from the column contained 1.6 million KIU of purity 0.2$\gamma$/KIU.

Example II

Two million KIU of purity 0.39$\gamma$/KIU were dissolved in 49 cubic centimeters of redistilled water and precipitated with 45 cubic centimeters of a one (1) percent freshly prepared solution of sodium polyphosphate, which was adjusted to a pH value of 11.8. The solution was then centrifuged, the precipitate washed with 10 cubic centimeters of redistilled water and, after centrifuging again, suspended in 100 cubic centimeters of redistilled water. It was then dissolved in 5 cubic centimeters of an N/10 caustic soda solution, with stirring. The resulting solution was caused to flow through an exchanger column which was charged with 15 cubic centimeters of a cation exchange resin (Levatit S 100 or Amberlite IR 120) and 45 cubic centimeters of an anion exchanger (Amberlite IRA 410).

The solution flowing from the column was found to contain 1.5 million KIU of purity 0.17$\gamma$/KIU.

What is claimed is:
1. Process for the production of substantially pure preparations of the kallikrein inactivator that comprises, treating a less pure solution containing said kallikrein inactivator with a member selected from the group consisting of polyphosphoric acids and their water-soluble salts to effect precipitation of said inactivator, separating said precipitate from the mother liquor and decomposing said separated precipitate by treatment with a member selected from the group consisting of aqueous caustic alkali, NaCl and $NH_4Cl$ solutions, and separating said kallikrein inactivator from the resulting solution in substantially pure form.

2. The process as claimed in claim 1, wherein said salts of polyphosphoric acids are selected from the group consisting of alkali metal and ammonium salts.

References Cited by the Examiner

Gardner et al.: American Journal of Physiology, volume 142, No. 4, pages 541 to 543, November 1944.

Chemical Abstracts, volume 58, column 8230(c), abstracting Belgian Patent No. 617,541, August 1962.

SAM ROSEN, *Primary Examiner.*

LEROY B. RANDALL, *Assistant Examiner.*